(12) United States Patent
Taylor et al.

(10) Patent No.: US 9,416,819 B2
(45) Date of Patent: Aug. 16, 2016

(54) RE-CIRCULATING BALL SLIDING SUPPORT ASSEMBLY

(75) Inventors: Jake Edward Taylor, Buckinghamshire (GB); Peter William Bayles, Northamptonshire (GB)

(73) Assignee: Accuride International Limited, Northamptonshire (GB)

( * ) Notice: Subject to any disclaimer, the term of this patent is extended or adjusted under 35 U.S.C. 154(b) by 117 days.

(21) Appl. No.: 14/347,403

(22) PCT Filed: Aug. 24, 2012

(86) PCT No.: PCT/GB2012/052083
§ 371 (c)(1),
(2), (4) Date: Jul. 2, 2014

(87) PCT Pub. No.: WO2013/045884
PCT Pub. Date: Apr. 4, 2013

(65) Prior Publication Data
US 2014/0328553 A1   Nov. 6, 2014

(30) Foreign Application Priority Data

Sep. 26, 2011 (GB) .................................. 1116563.6

(51) Int. Cl.
| | |
|---|---|
| *F16C 29/06* | (2006.01) |
| *A47B 88/04* | (2006.01) |
| *F16C 33/76* | (2006.01) |
| *F16C 29/00* | (2006.01) |
| *F16C 29/08* | (2006.01) |

(52) U.S. Cl.
CPC .......... *F16C 29/0678* (2013.01); *F16C 29/004* (2013.01); *F16C 29/008* (2013.01); *F16C 29/063* (2013.01); *F16C 29/084* (2013.01); *F16C 33/76* (2013.01)

(58) Field of Classification Search
CPC .... F16C 29/004; F16C 29/008; F16C 29/063; F16C 29/084; F16C 29/0678; F16C 33/76; F16C 33/7816
USPC ......... 384/13, 15, 43–45, 49, 50; 312/334.11, 312/334.17, 334.33
See application file for complete search history.

(56) References Cited

U.S. PATENT DOCUMENTS

| | | | |
|---|---|---|---|
| 4,701,057 A | 10/1987 | Kashiwabara | |
| 4,806,022 A * | 2/1989 | Takahiro | ............. F16C 29/0602 384/45 |

(Continued)

FOREIGN PATENT DOCUMENTS

| | | |
|---|---|---|
| EP | I363036 A2 | 11/2003 |
| WO | 2010137529 A1 | 12/2010 |

OTHER PUBLICATIONS

Search Report of the Intellectual Property Office of the United Kingdom for priority United Kingdom Application No. GB1116563.

(Continued)

*Primary Examiner* — Marcus Charles
(74) *Attorney, Agent, or Firm* — Thomas B. Ryan; Harter Secrest & Emery LLP (57) ABSTRACT

A re-circulating ball sliding support comprises an elongate rail and a slide cassette. The slide cassette includes structure that interacts with the rail to seal the sliding support assembly such that the ingress of dirt into the slide cassette is prevented, and any lubricant for the balls is retained within the slide cassette.

33 Claims, 9 Drawing Sheets

(56) References Cited

U.S. PATENT DOCUMENTS

| | | | | |
|---|---|---|---|---|
| 4,892,415 A | * | 1/1990 | Katahira | F16C 29/063 384/45 |
| 4,973,291 A | * | 11/1990 | Mottate | F16C 29/04 384/49 |
| 5,092,685 A | | 3/1992 | Tonogai | |
| 5,275,492 A | * | 1/1994 | Shirai | F16C 29/0607 384/15 |
| 5,387,038 A | * | 2/1995 | Abe | F16C 29/084 384/15 |
| 5,411,334 A | | 5/1995 | Takei et al. | |
| 5,518,317 A | | 5/1996 | Osawa | |
| 5,593,003 A | | 1/1997 | Abe et al. | |
| 5,624,195 A | * | 4/1997 | Abe | F16C 29/063 384/15 |
| 5,851,073 A | * | 12/1998 | Takeuchi | F16C 29/0602 384/45 |
| 5,884,549 A | * | 3/1999 | Hosono | B23Q 1/58 92/13.7 |
| 6,899,462 B2 | * | 5/2005 | Friedrich | F16C 29/0609 384/45 |
| 8,272,783 B2 | * | 9/2012 | Mochizuki | A47B 88/14 312/334.11 |
| 8,303,183 B2 | * | 11/2012 | Chen | F16C 29/063 312/334.11 |
| 2006/0260425 A1 | | 11/2006 | Mizumura et al. | |
| 2011/0138942 A1 | | 6/2011 | Murata | |
| 2012/0073396 A1 | | 3/2012 | Kawaguchi et al. | |

OTHER PUBLICATIONS

International Search Report and Written Opinion of the International Searching Authority dated Sep. 21, 2012 in corresponding International Application No. PCT/GB2012/052083 (12 pages).

* cited by examiner

RE-CIRCULATING BALL SLIDING SUPPORT ASSEMBLY

FIELD OF THE INVENTION

The invention relates to sliding support assemblies and particularly re-circulating ball sliding support assemblies which allow for relative linear motion between two elements.

BACKGROUND OF THE INVENTION

Linear motion, re-circulating ball, sliding support assemblies are known in the art. Such support assemblies allow a variety of potential setups to be achieved in order to move objects along a linear rail. Such rails can be made from extruded lengths of aluminium of, for example, 1 m or 2 m in length. The lengths of rail can be cut to length, drilled or machined as required by the user.

Such sliding supports include a slide cassette and a plurality of bearing balls. The slide cassette may be made from one or two polymer or resin components, and/or a stainless steel, nitrided steel, or aluminium member. The slide cassette can be arranged within a length of rail chosen by the user.

For example, U.S. Pat. No. 4,701,057 discloses a sliding support assembly comprising a linear rail having a web and a pair of flanges. The inner surface of each flange includes a first linear guide groove. The assembly includes a slider unit including a pair of endless circulating paths in which a plurality of bearing balls can move. The slider unit includes a main body comprised of upper and lower body sections, in which the endless paths are defined, and a frame attached to the main body. The frame comprises a channel-section member having a pair of linear second guide grooves formed in the outer surface of the member's flanges. The linear second guide grooves extend in opposed relation to the corresponding first guide grooves, and partly define the endless paths. Similar slide assemblies are disclosed in U.S. Pat. No. 5,518,317 and EP 1 363 036.

In all of the known re-circulating ball slide assemblies which have a slide cassette arranged within a rail, there is no mechanism for preventing the ingress of dirt into the ball paths, and no mechanism for retaining lubricant within the ball paths.

Accordingly, there is a need for an improved re-circulating ball sliding support assembly in which the ball paths are sealed against the ingress of dirt, and the lubricant is retained within the ball paths.

SUMMARY OF THE INVENTION

The present invention addresses this need by providing a sliding support assembly comprising:
  an elongate rail of channel section defining a first web and first and second flanges;
  a slide cassette positioned between the first and second flanges of the elongate rail such that the slide cassette and the first and second flanges define a pair of endless tracks;
  a plurality of bearing balls positioned within the pair of endless tracks; and
  at least one sealing member for sealing upper and/or end portions of the slide cassette to prevent the ingress of dirt into the endless tracks.

Preferably, no part of the slide cassette is wider than, or extends beyond, the external width of the elongate rail.

Preferably, the at least one sealing member also retains lubricant within the endless tracks. However, the endless tracks may not include lubricant.

At least one of the at least one sealing members may be molded as part of the slide cassette. Alternatively, at least one of the at least one sealing members may be formed separately from, and affixed to, the slide cassette.

The slide cassette may comprise a first moulded or machined body having the endless tracks formed therein. The body may be formed from steel, aluminium, an alloy thereof, such as stainless steel or nitrided steel, or a polymer material.

In a preferred embodiment,
  the at least one sealing member comprises:
    a widened upper portion of the slide cassette which extends above and in contact with upper portions of the first and second flanges to seal an upper portion of the endless tracks; and
    first and second end pieces each having a cross-section which includes a first portion that corresponds to the internal cross section of the elongate rail to seal end portions of the endless tracks.

In addition, each of the first and second end pieces may include a second portion which extends above and in contact with upper portions of the first and second flanges to further seal the upper portion of the endless tracks.

The ball tracks may also have a lubricant, such as grease, positioned therein.

The widened upper portion of the slide cassette and the first and second end pieces together form a seal which prevents the ingress of dirt and the escape of lubricant from the ball tracks. The seal is provided by contact between the body member and the elongate rail, and the end pieces and the elongate rail.

The widened upper portion of the slide cassette and the second portion of the end pieces may be positioned adjacent to one another such that they form a continuous upper surface above the first and second flanges.

The widened upper portion of the slide cassette may include a pair of rib portions. Similarly, the second portion of each end piece may include a pair of rib portions. Each rib portion may comprise a thin, oversized rib portion that is capable of assuming a part of the shape of the upper surfaces of the first and second flanges of the rail such that the rib portions effectively provide a seal against the rail.

The use of a thin wall of material allows the flexibility to overcome the tolerances of the components of the support, and to ensure a suitable seal is formed.

The slide cassette may comprise:
  an elongate slide member of channel section defining a second web and third and fourth flanges; and
  a body member positioned between the rail and the slide member such that the body member, the first and second flanges, and the third and fourth flanges define the pair of endless tracks.

The body member may have a pair of parallel slots therein, and the third and fourth flanges may extend through the pair of parallel slots.

The widened upper portion of the slide cassette may comprise a widened upper portion of the body member.

The body member and the first and second end pieces may be formed as a single component.

The body portion and the end pieces may be formed from a polymer material such as Polypropylene (PP), Nylon (PA) and Polyoxymethylene (POM), or from steel, aluminium or another suitable alloy. The slide member and bearing balls may be formed from steel, aluminium or an alloy thereof such as stainless steel or nitrided steel, or a polymer such as Polypropylene (PP), Nylon (PA) and Polyoxymethylene (POM), or ceramic. Such materials allow for a corrosion resistant product.

Each end piece may be formed as a unitary piece. Consequently the first and second portions of each end piece may be formed together as a single entity. Each end piece may be moulded from a plastics material such as a polymer, such as Polypropylene (PP), Nylon (PA) and Polyoxymethylene (POM), or a suitable elastomer such as a form of rubber, or similar material.

The elongate rail may include first linear guide grooves formed in inner surfaces of each of the first and second flanges. The first and second flanges may be substantially C shaped. The first and second flanges may further include a lipped portion at their upper ends, over which at least one of the at least one sealing members extends. In particular, at least one of the at least one sealing members may have a cross-section that includes hooked outer sections. The hooked outer sections may be downwardly facing such that they extend over the corresponding upwardly facing lipped portions of the elongate rail.

Preferably the widened upper portion of the body member and the second portions of the end pieces extend over the lipped portion at the upper ends of the first and second flanges. In particular, the widened upper portion of the body member and the second portions of the end pieces may have cross-sections that include the hooked outer sections.

The slide cassette may include second linear guide grooves. Preferably the elongate slide member includes the second linear guide grooves, which are formed in external surfaces of each of the third and fourth flanges.

The body member may comprise a first body member and a second body member. In particular, the first body member may comprise a lower body member, and the second body member may comprise an upper body member. The lower body member may define a lower half of each of the pair of endless tracks. The upper body member may define an upper half of each of the pair of endless tracks. The widened upper portion may be part of the upper body member. The first and second body members may be connected to one another by any suitable means depending on the material and design of the body members. For example, the first and second body members may be connected to one another by means of one or more snap-fit joints. The parallel slots in the body member may extend through the upper body member.

The flanges of the elongate rail and slide member may be positioned parallel to one another. The parallel slots in the body member may be orientated in a direction parallel to the flanges of the elongate rail and slide member.

Each of the pair of endless tracks may take a racetrack shape. That is, each track may be in the shape of a rounded rectangle with semi-circular ends. The endless tracks may be arranged in a plane which is parallel to the plane of the web of the elongate rail. The portion of each rectangle closest to the adjacent flange of the elongate rail comprises the outer linear portion of the track, and the portion of the rectangle furthest from the adjacent flange of the elongate rail comprises the inner linear portion of the track.

The first and second guide grooves in the elongate rail and the slide cassette may form the outer linear portions of the endless tracks. In particular, the first guide grooves in the elongate rail may form the outer surfaces of the outer linear portions of the endless tracks, and the second guide grooves in the slide cassette may form the inner surfaces of the outer linear portion of the endless tracks. The slide cassette, or the body member thereof, may form the inner linear portions and the semi-circular end portions of the endless tracks.

The rail may be connectable to a first object using a fixing means mounted within one or more countersunk holes in the web of the rail. Examples of suitable fixing means include screws, rivets or nails. The slide cassette may be connectable to a second object using a fixing means mounted to the slide cassette. The fixing means may comprise threaded studs extending from the slide cassette.

The system may include more than one slide cassette mounted within a linear rail.

The linear rail may comprise a length of aluminium, polymer, steel or other suitable material or alloy, manufacture by extrusion, forming, machining or other suitable process. The linear rail may comprise more than one lengths of rail connected together end to end.

In use, the bearing balls are positioned within the endless tracks and roll around the endless tracks. The balls roll along the outer linear portions of the tracks, against both the elongate rail and the slide member when they are being used to reduce friction between the rail and the slide member. When the balls are not being used to perform this function, they travel along the inner linear portions of the tracks, and are pushed along by the same force that gives the slide member its motion relative to the rail. As the balls reach the end of the inner linear portions, they are pushed around the semi-circular end portions of the endless tracks and are forced back into the outer linear portion where they are used to reduce friction between the slide member and the rail. Since the sliding support of the present invention does not include a standard bearing ball retainer, synchronisation between components of the sliding support is maintained during use, and the arrangement does not suffer from inching and can be used in vertical applications.

BRIEF DESCRIPTION OF THE FIGURES

By way of example, embodiments of sliding support assemblies according to the invention will now be described with reference to the accompanying drawings, in which.

DETAILED DESCRIPTION OF THE FIGURES

FIGS. 1 to 9 show various views of a sliding support assembly 10 according to a first embodiment of the present invention. The sliding support assembly 10 includes an elongate rail 20 of channel section defining a first web 22 and first and second flanges 24, 26. The sliding support assembly 10 also includes a slide cassette 30 which comprises an elongate slide member 40, a body member 50, a plurality of bearing balls 60, and first and second end pieces 70.

The elongate slide member 40 is of channel section, defining a second web 42 and third and fourth flanges 44, 46. The body member 50 is positioned between the rail 20 and the slide member 40. The body member 50 has a pair of parallel slots 52 therein. As best seen from FIG. 3, the third and fourth flanges 44, 46 extend through the pair of parallel slots 52 such that the body member 50, the first and second flanges 24, 26, and the third and fourth flanges 44, 46 define a pair of endless tracks 80.

The body member 50 includes a widened upper portion 54 which extends above and in contact with upper portions 25, 27 of the first and second flanges 24, 26 to seal an upper portion of the endless tracks 80. As is clear from FIGS. 1 to 3, 5 and 6, the upper portion 54 of the body members is positioned above the flanges 24, 26 of the rail 20.

The first and second end pieces 70, and the widened upper portion 54 of the body member 50, together form the at least sealing member.

A plurality of bearing balls 60 are positioned within the pair of endless tracks 80.

Figure 2:
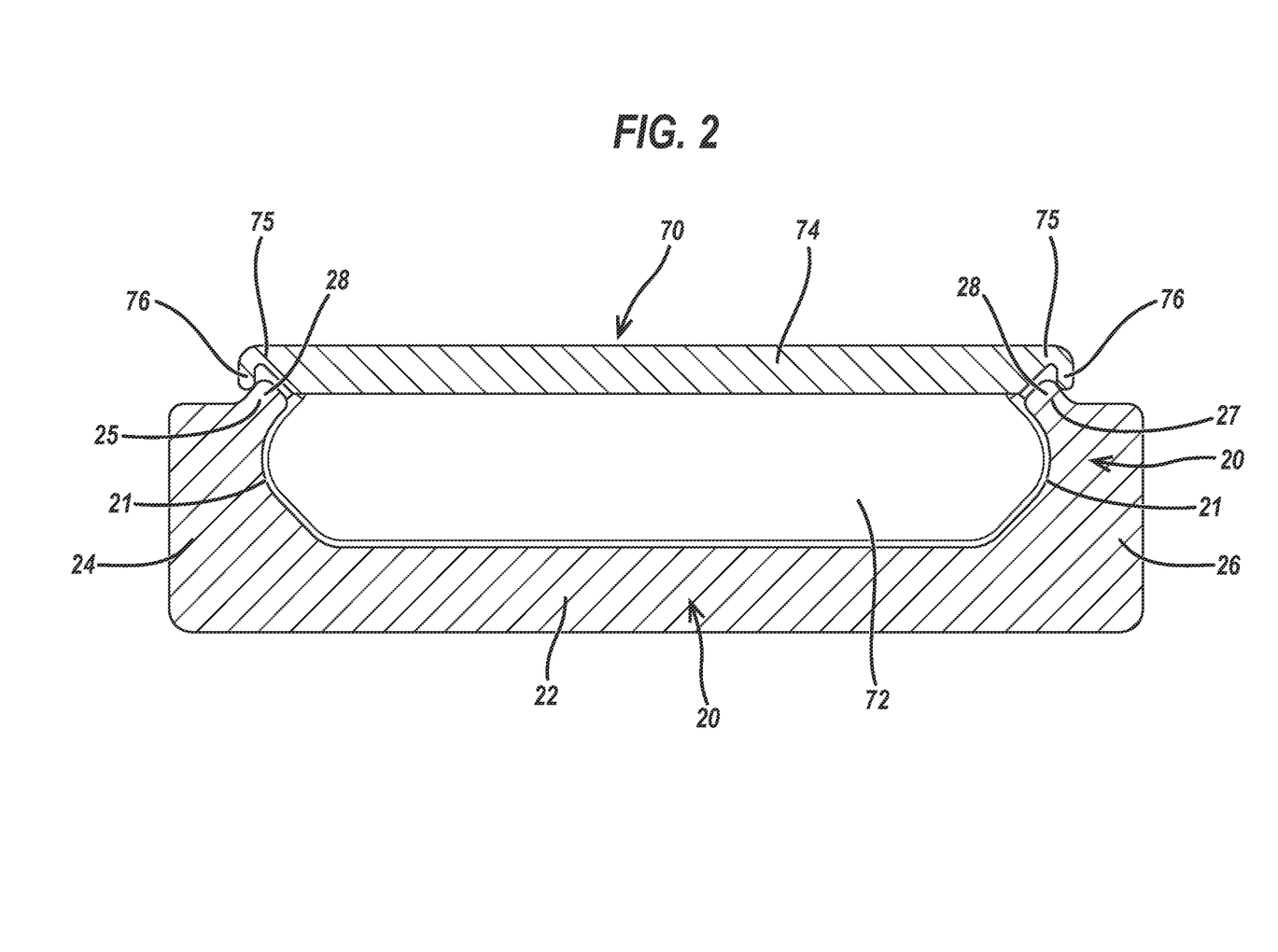
FIG. 2 is a sectional view of the sliding support assembly of FIG. 1, taken through line A-A.
Figure 3:
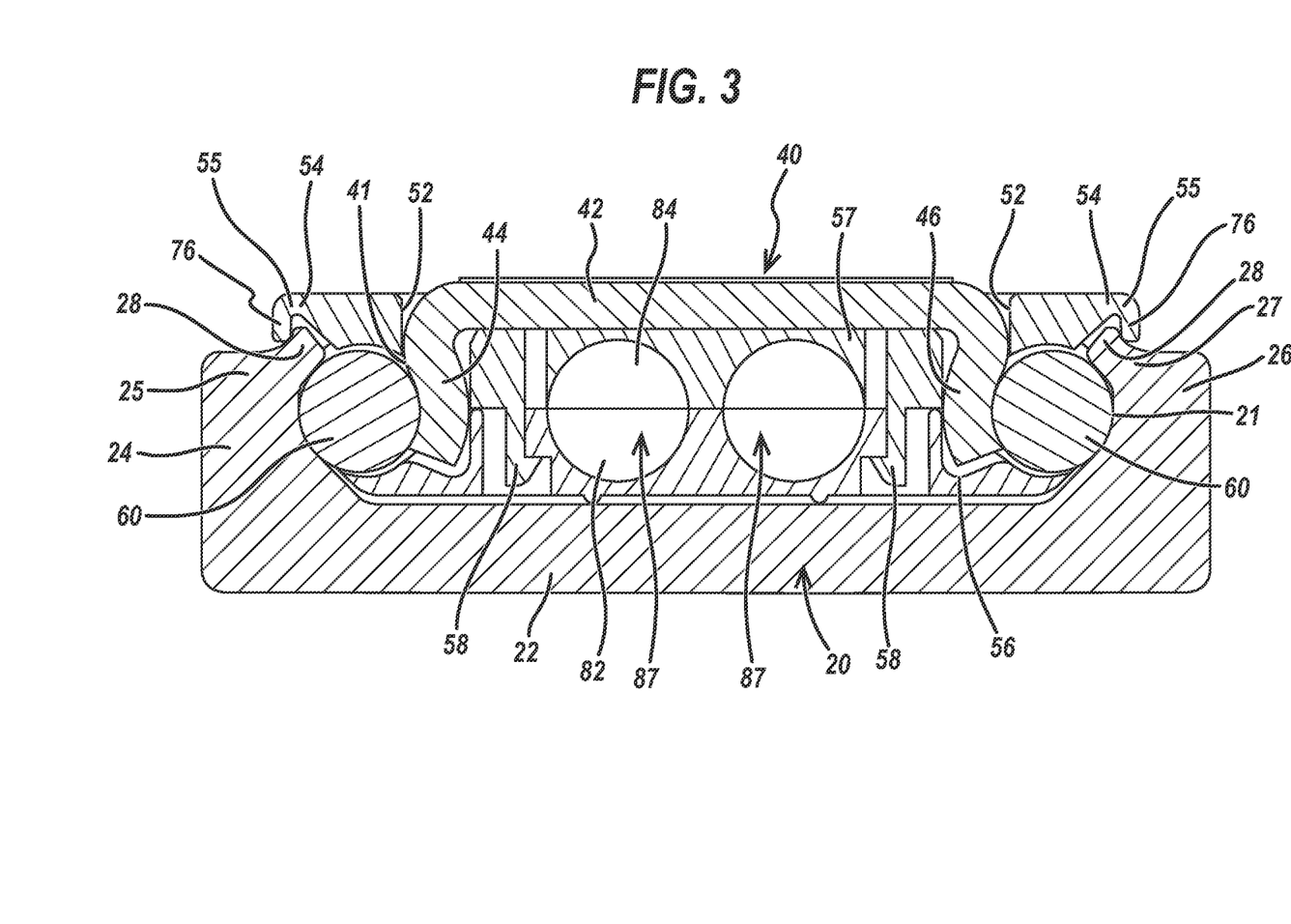
FIG. 3 is a sectional view of the sliding support assembly of FIG. 1, taken through line B-B.
Figure 4:
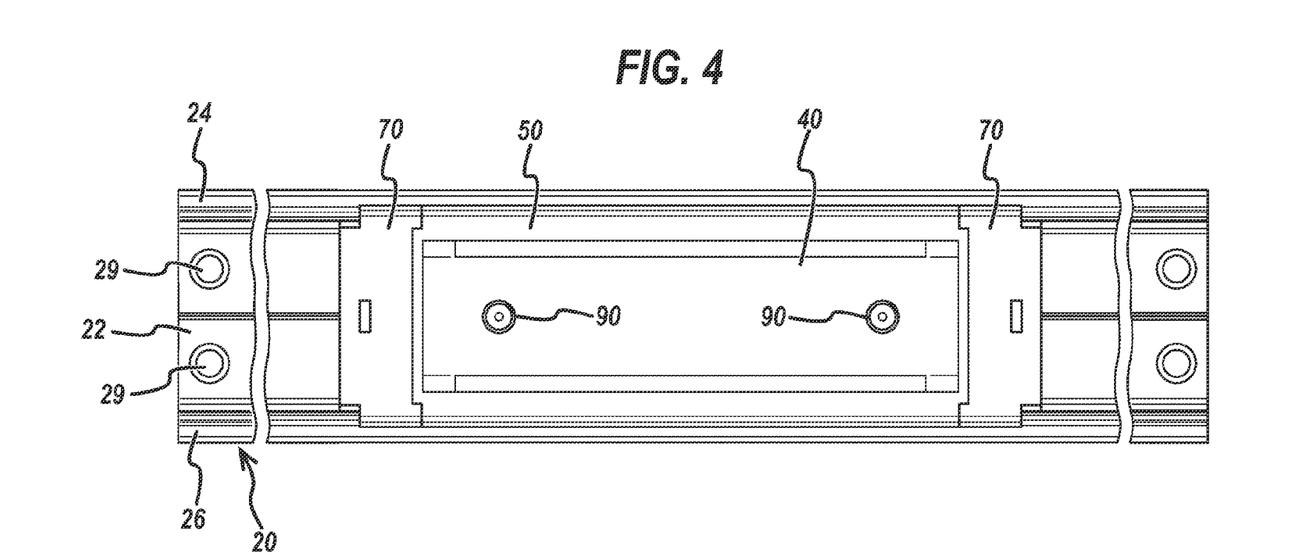
FIG. 4 is a top view of the sliding support assembly of FIG. 1.
Figure 5:
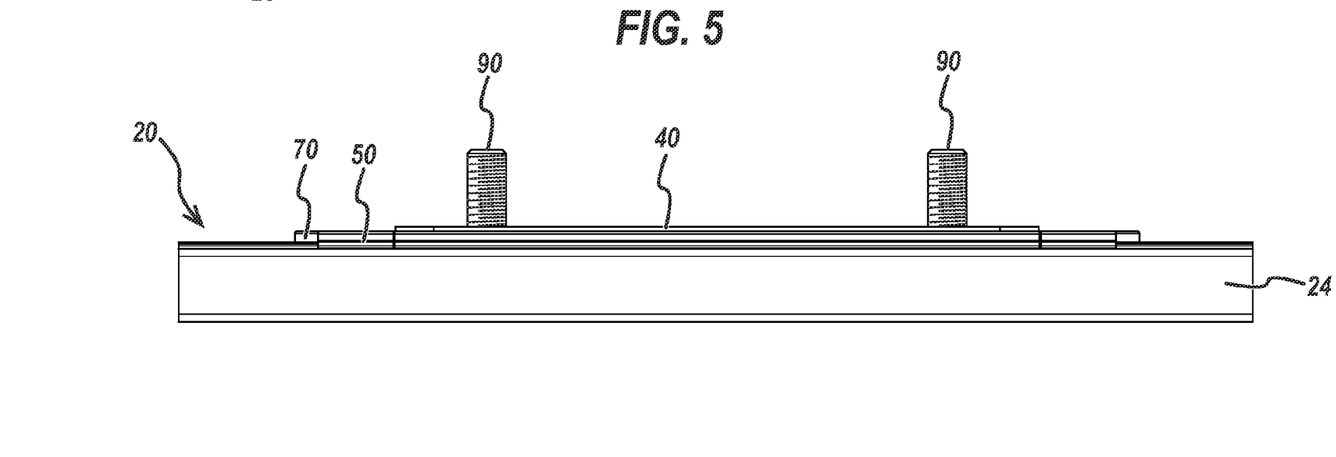
FIG. 5 is a side view of the sliding support assembly of FIG. 1.
Figure 6:
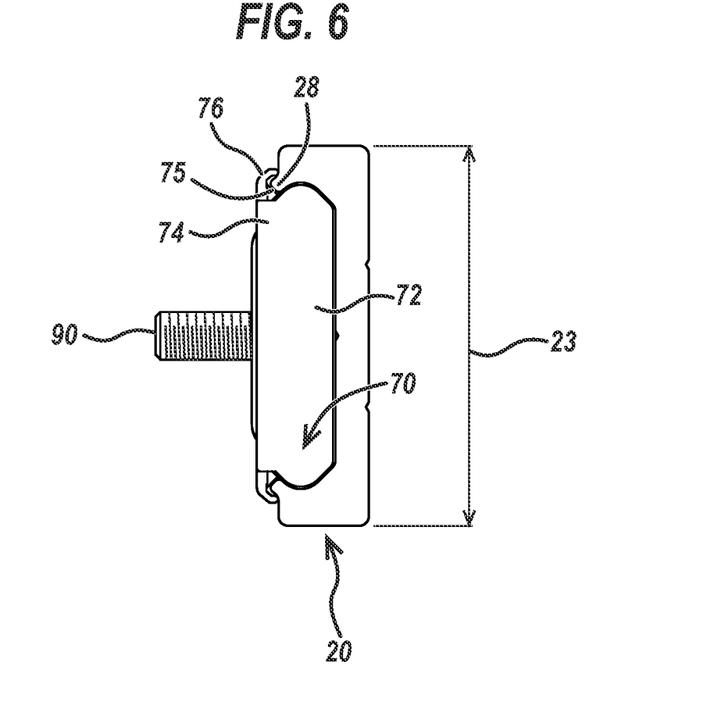
FIG. 6 is an end view of the sliding support assembly of FIG. 1.

As best seen from FIGS. 2 and 6, the slide cassette 30 further includes first and second end pieces 70 each having a cross-section which includes a first portion 72 that corresponds to the internal cross section of the elongate rail 20, and a second portion 74 which extends above and in contact with upper portions 25, 27 of the first and second flanges 24, 26 to seal the ends of the slide cassette 30.

The ball tracks 80 also have a lubricant (not shown), such as grease, positioned therein.

The widened upper portion 54 of the body member 50 and the first and second end pieces 70 together form a seal which prevents the ingress of dirt and the escape of lubricant from the ball tracks 80. The seal is provided by contact between the body member 50 and the elongate rail 20, and the end pieces 70 and the elongate rail 20.

Figure 1:
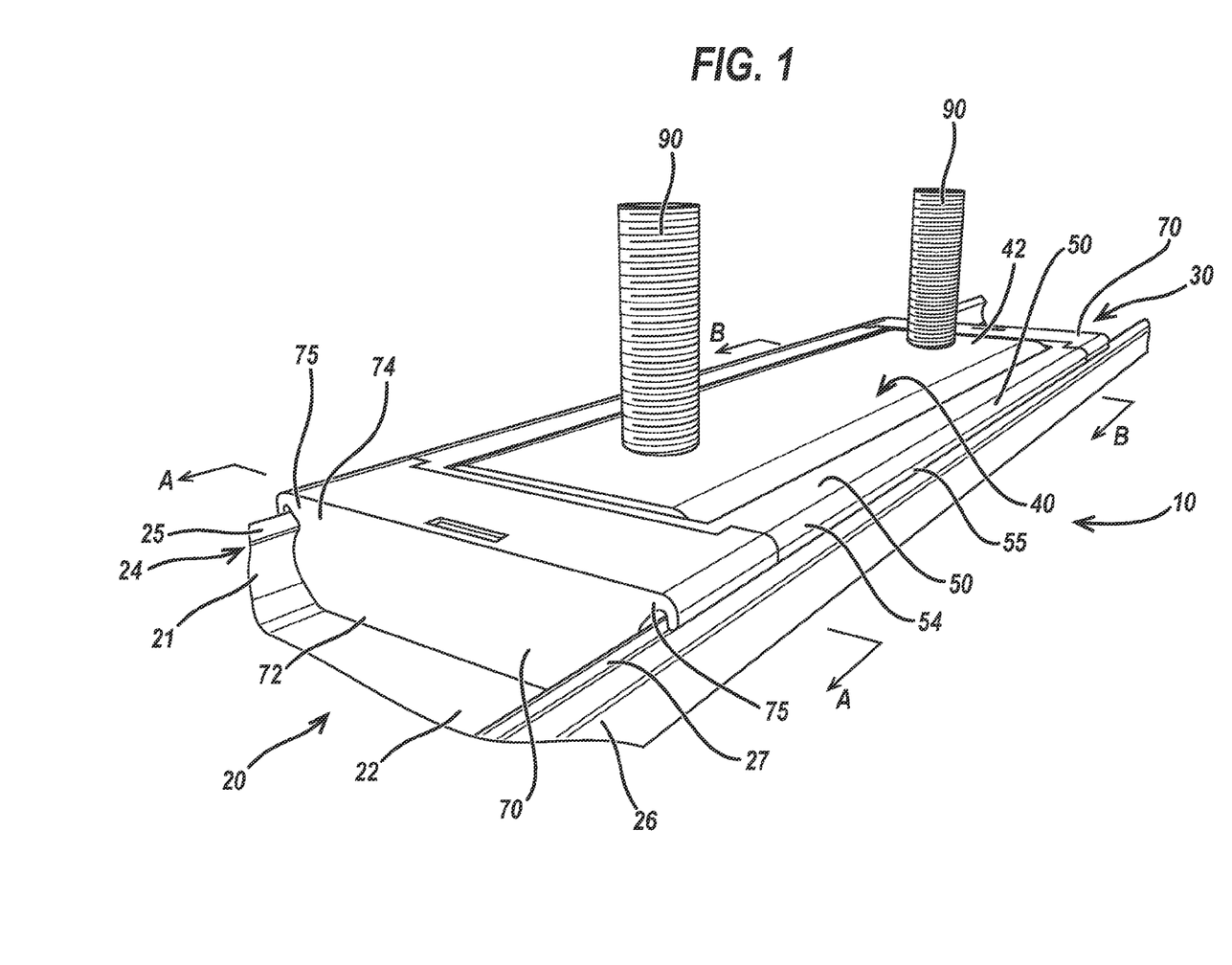
FIG. 1 is a perspective view of a sliding support assembly according to a first embodiment of the present invention.

As best seen from FIG. 1, the widened upper portion 54 of the body member 50 and the second portion 74 of the end pieces 70 are positioned adjacent to one another such that they form a continuous upper surface of the slide cassette 30, above the first and second flanges 24, 26.

The widened upper portion 54 of the body member 50 includes a pair of rib portions 55. Similarly, the second portion 74 of each end piece 70 includes a pair of rib portions 75. Each rib portion 55, 75 comprises a thin, oversized rib portion 55, 75 that is capable of assuming the shape of the upper portions 25, 27 of the first and second flanges 24, 26 of the rail 20 such that the rib portions 55, 75 effectively provide a seal against the rail 20.

The use of a thin rib of material allows the flexibility to overcome the tolerances of the components of the support 10, and to ensure a suitable seal is formed.

The body member 50 and the end pieces 70 are formed from a polymer material, and the slide member 40 and bearing balls 60 are formed from stainless steel. Such materials allow for a corrosion resistant product.

Each end piece 70 is formed as a unitary piece. Consequently the first and second portions 72, 74 of each end piece 70 are formed together as a single entity. Each end piece 70 is moulded from a plastics material such as a polymer.

The elongate rail 20 includes first linear guide grooves 21 formed in inner surfaces of each of the first and second flanges 24, 26. The first and second flanges 24, 26 are substantially C shaped. The first and second flanges 24, 26 further include a lipped portion 28 at their upper ends 25, 27, over which the widened upper portion 54 of the body member 50 and the second portions 74 of the end pieces 70 extend. In particular, the widened upper portion 54 of the body member 50 and the second portions 74 of the end pieces 70 have cross-sections that include hooked outer sections 76. The hooked outer sections 76 are downwardly facing such that they extend over the corresponding upwardly facing lipped portions 28 of the elongate rail 20.

The elongate slide member 40 includes second linear guide grooves 41 formed in external surfaces of each of the third and fourth flanges 44, 46.

The body member 50 comprises a first body member 56 and a second body member 57. In particular, the first body member 56 comprises a lower body member 56, and the second body member 57 comprises an upper body member 57. The lower body member 56 forms a lower half 82 of each of the pair of endless tracks 80. The upper body member 57 comprises an upper half 84 of each of the pair of endless tracks 80. The widened upper portion 54 is part of the upper body member 57. The first and second body members 56, 57 are connected to one another by means of one or more snap-fit joints 58. The parallel slots 52 in the body member 50 extend through the upper body member 57.

The flanges 24, 26, 44, 46 of the elongate rail 20 and slide member 40 are positioned parallel to one another. The parallel slots 52 in the body member 50 are orientated in a direction parallel to the flanges 24, 26, 44, 46 of the elongate rail 20 and slide member 40.

Each of the pair of endless tracks 80 takes the shape of a racetrack. That is, each track 80 is in the shape of a rounded rectangle with semi-circular ends 85. The endless tracks 80 are arranged in a plane which is parallel to the plane of the web 22 of the elongate rail 20. The portion of each rectangle closest to the adjacent flange 24, 26 of the elongate rail 20 comprises the outer linear portion 86 of the track 80, and the portion of the rectangle furthest from the adjacent flange 24, 26 of the elongate rail 20 comprises the inner linear portion 87 of the track 80.

The first and second guide grooves 21, 41 in the elongate rail 20 and the elongate slide member 40 form the outer linear portions 86 of the endless tracks 80. In particular, the first guide grooves 21 in the elongate rail 20 form the outer surfaces of the outer linear portions 86 of the endless tracks 80, and the second guide grooves 41 in the elongate slide member 40 form the inner surfaces of the outer linear portion 86 of the endless tracks 80. The body member 50 forms the inner linear portions 87 and the semi-circular end portions 85 of the endless tracks 80.

The rail 20 is connectable to a first object using a fixing means mounted within one or more countersunk holes 29 in the web 22 of the rail 20. Examples of suitable fixing means include screws, rivets or nails. The slide cassette 30 is connectable to a second object using a fixing means mounted to the slide cassette 30. The fixing means comprises threaded studs 90 extending from the slide cassette 30. In the embodiment shown, the threaded studs 90 have an M5 thread, although any suitable fixing means can be used.

The elongate rail 20 comprises a linear rail 20 comprising an extruded length of aluminium.

Figure 7:
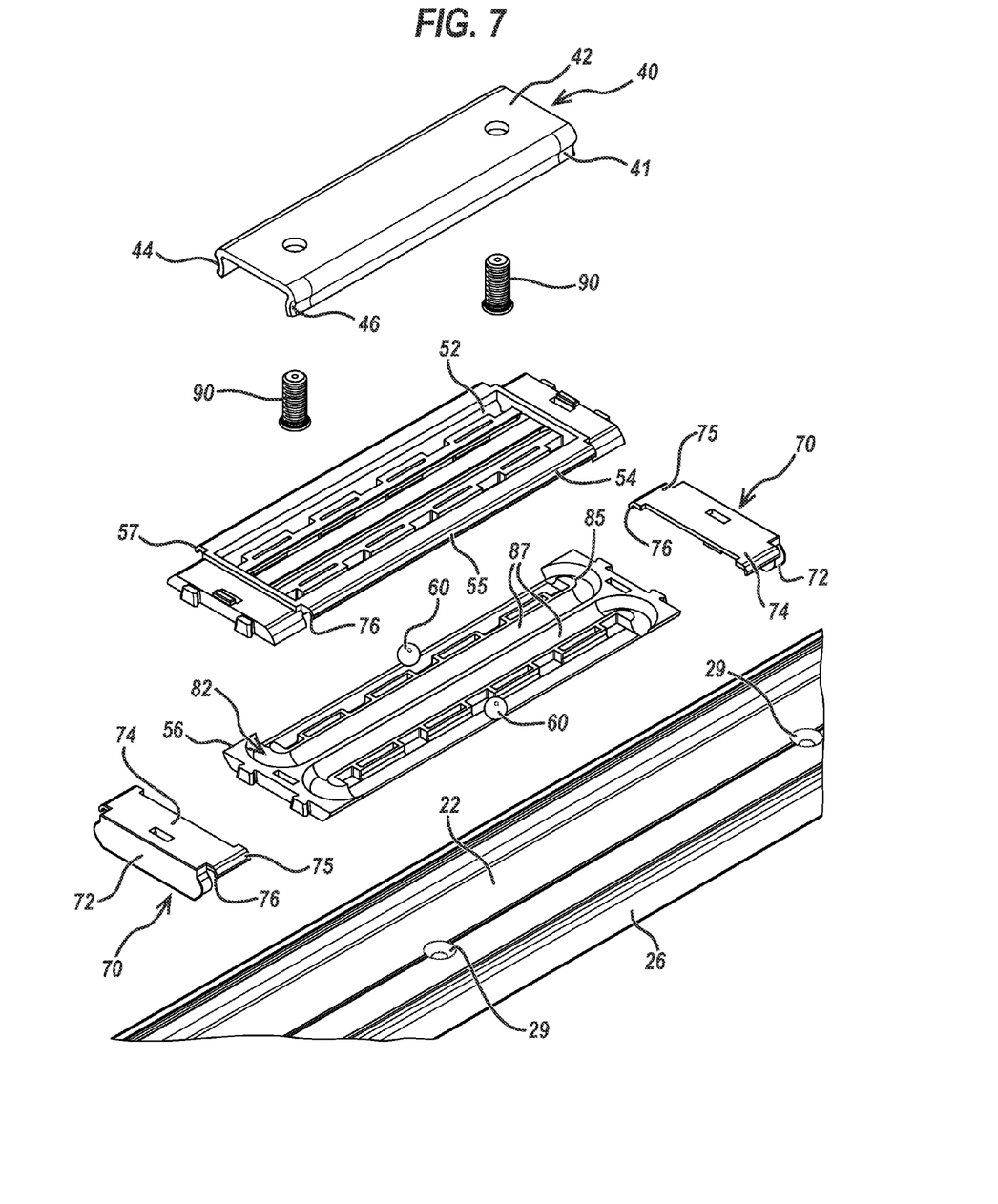
FIG. 7 is an exploded view showing the component parts of the sliding support assembly of FIG. 1.
Figure 8:
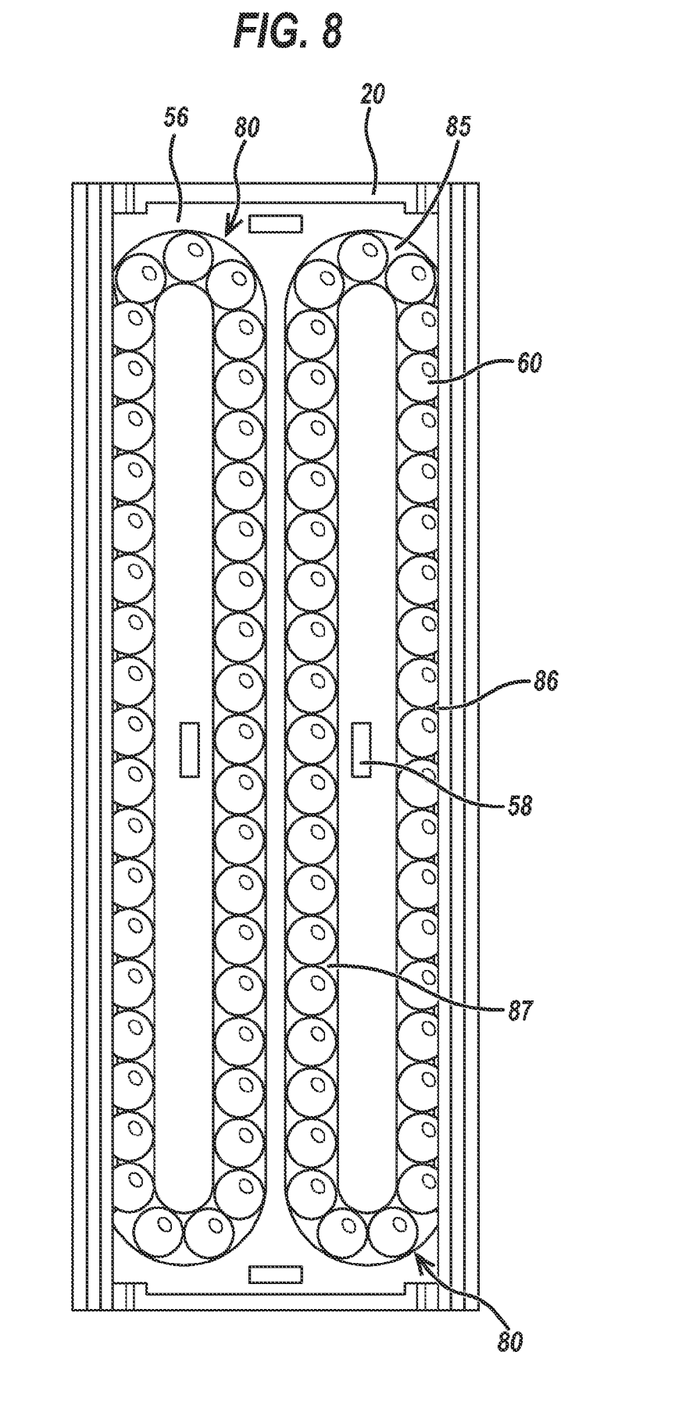
FIG. 8 is top view of the rail, lower body member and bearing balls of the sliding support assembly of FIG. 1.
Figure 9:
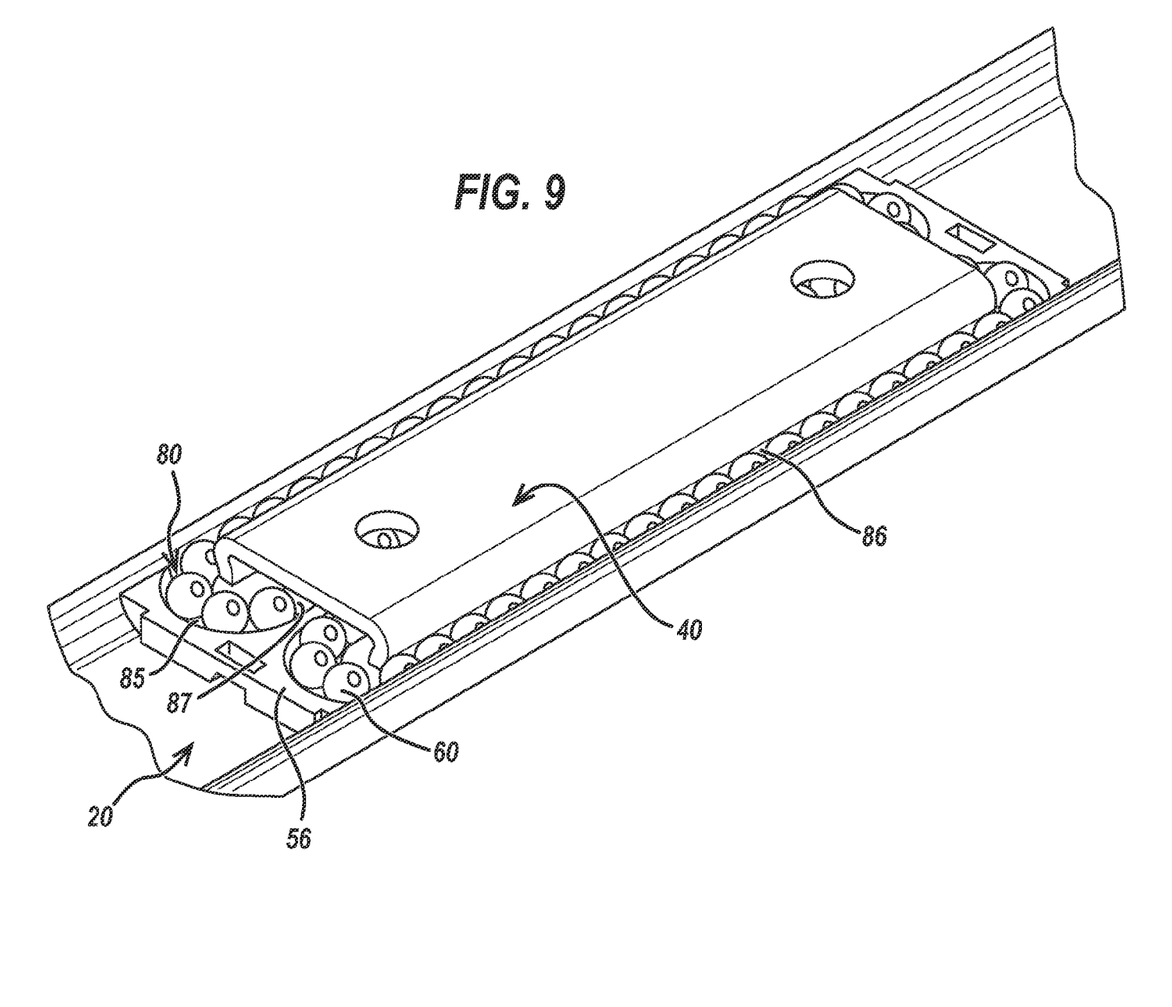
FIG. 9 is a perspective view of the rail, lower body member, bearing balls and slide member of the sliding support assembly of FIG. 1.

As best seen from FIGS. 7, 8 and 9, in use, the bearing balls 60 are positioned within the endless tracks 80 and roll around the endless tracks 80. The balls 60 roll along the outer linear portions 86 of the tracks 80, against both the elongate rail 20 and the slide member 40 when they are being used to reduce friction between the rail 20 and the slide member 40. When the balls 60 are not being used to perform this function, they travel along the inner linear portions 87 of the tracks 80, and are pushed along by the same force that gives the slide member 40 its motion relative to the rail 20. As the balls 60 reach the end of the inner linear portions 87, they are pushed around the semi-circular end portions 85 of the endless tracks 80 and are forced back into the outer linear portion 86 where they are again used to reduce friction between the slide member 40 and the rail 20.

Figure 10:
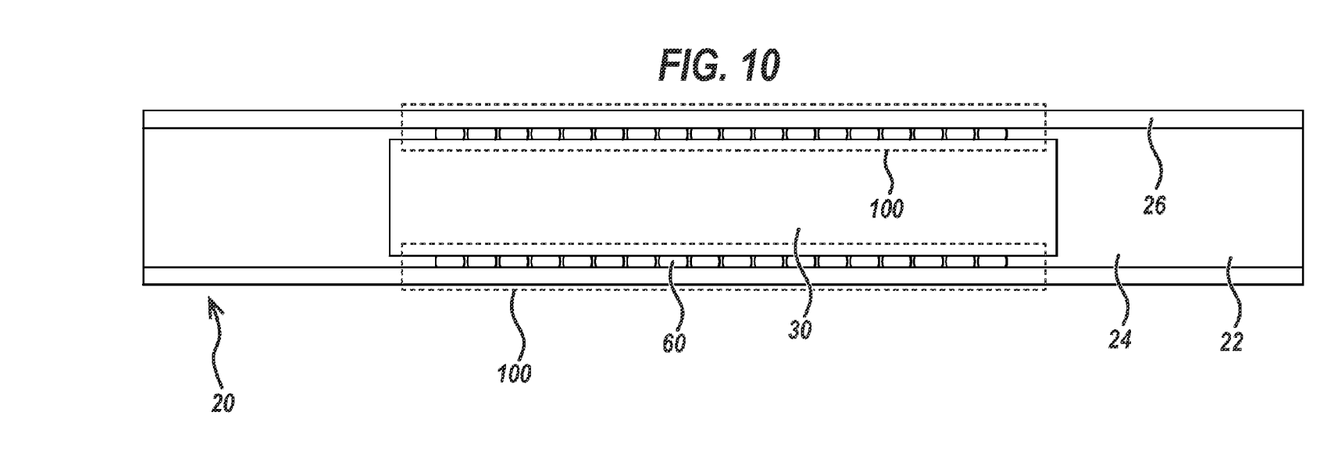
FIG. 10 is a top schematic view of a sliding support assembly showing the upper portions of the slide cassette which require sealing.
Figure 11:
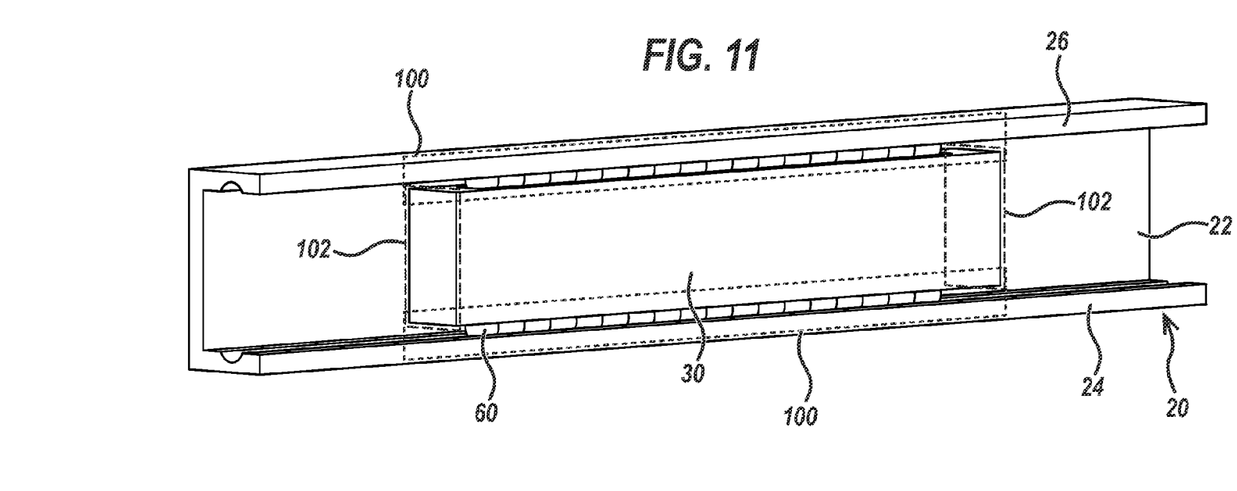
FIG. 11 is a perspective schematic view of the sliding support assembly of FIG. 10 showing the upper and end portions of the slide cassette which require sealing.
Figure 12:
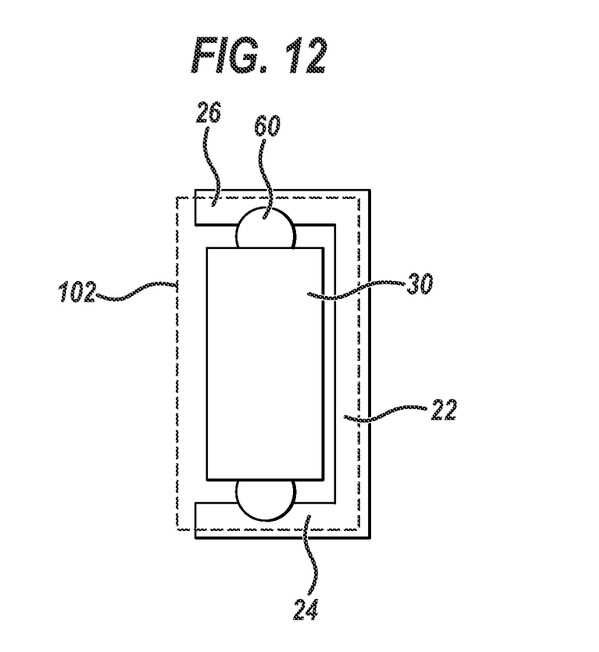
FIG. 12 is an end schematic view of a sliding support assembly showing an end portion of the slide cassette which requires sealing.

FIGS. 10 to 12 show schematic representations of a sliding support assembly having an elongate rail 20 of channel section defining a first web 22 and first and second flanges 24, 26. The assembly also includes a slide cassette 30 which is positioned between the first and second flanges 24, 26 of the elongate rail 20 such that the slide cassette 30 and the first and second flanges 24, 26 define a pair of endless tracks. A plurality of bearing balls 60 are positioned within the pair of endless tracks. FIGS. 10 to 12 show the areas of the cassette and ball tracks that need to be sealed. In particular, boxes 100 highlight the upper portions of the slide cassette which need to be sealed, and boxes 102 highlight the end portions of the slide cassette which need to be sealed. At least one sealing member (not shown) is connected to, or formed as part of, the slide cassette 30 in order to seal the upper and end portions 100, 102 of the slide cassette 30 to prevent the ingress of dirt into the endless tracks. The at least one sealing member also functions to retain lubricant within the endless tracks.

As is clear from all of the figures, and particularly FIG. 6, no part of the slide cassette 30, including the sealing members, is wider than, or extends beyond, the external width 23 of the elongate rail 30.

It will be appreciated that the embodiments shown in the figures are by way of example only, and that alterations or modifications may be made within the scope of the invention as defined in the appended claims.

The invention claimed is:

1. A sliding support assembly comprising:
   an elongate rail of channel section defining a first web and first and second flanges;
   a slide cassette positioned between the first and second flanges of the elongate rail such that the slide cassette and the first and second flanges define a pair of endless tracks;
   a plurality of bearing balls positioned within the pair of endless tracks; and
   at least one sealing member for sealing upper portions of the slide cassette to prevent the ingress of dirt into the endless tracks, wherein the at least one sealing member comprises:
   a widened upper portion of the slide cassette which extends above and in contact with upper portions of the first and second flanges to seal an upper portion of the endless tracks.

2. The sliding support assembly of claim 1 wherein no part of the slide cassette is wider than, or extends beyond, the external width of the elongate rail.

3. The sliding support assembly of claim 1 wherein at least one of the at least one sealing members is molded as part of the slide cassette.

4. The sliding support assembly of claim 1 wherein at least one of the at least one sealing members is formed separately from, and affixed to, the slide cassette.

5. The sliding support assembly of claim 1 wherein the slide cassette comprises a first moulded or machined body having the endless tracks formed therein.

6. The sliding support assembly of claim 1, wherein the at least one sealing member further seals end portions of the slide cassette and wherein the at least one sealing member comprises:
   first and second end pieces each having a cross-section which includes a first portion that corresponds to the internal cross section of the elongate rail to seal end portions of the endless tracks.

7. The sliding support of claim 6 wherein each of the first and second end pieces includes a second portion which extends above and in contact with upper portions of the first and second flanges to further seal the upper portion of the endless tracks.

8. The sliding support assembly of claim 7 wherein the widened upper portion of the slide cassette and the second portion of the end pieces are positioned adjacent to one another such that they form a continuous upper surface above the first and second flanges.

9. The sliding support assembly of claim 6 wherein the widened upper portion of the slide cassette and the first and second end pieces together form a seal.

10. The sliding support assembly of claim 7 wherein the widened upper portion of the slide cassette includes a pair of rib portions and the second portion of each end piece includes a pair of rib portions.

11. The sliding support assembly of claim 10 wherein each rib portion is capable of assuming the shape of the upper surfaces of the first and second flanges of the rail.

12. The sliding support assembly of claim 6, wherein the slide cassette comprises an elongate slide member of channel section defining a second web and third and fourth flanges; and
   a body member positioned between the rail and the slide member such that the body member, the first and second flanges, and the third and fourth flanges define the pair of endless tracks.

13. The sliding support assembly of claim 12 wherein the body member has a pair of parallel slots therein, and the third and fourth flanges extend through the pair of parallel slots.

14. The sliding support assembly of claim 12, wherein the widened upper portion of the slide cassette comprises a widened upper portion of the body member.

15. The sliding support assembly of claim 12, wherein the body member and the first and second end pieces are formed as a single component.

16. The sliding support assembly of claim 12 wherein the first and second flanges include a lipped portion at their upper ends, wherein at least one of the at least one sealing members extends over the lipped portion.

17. The sliding support assembly of claim 16 wherein at least one of the at least one sealing members has a cross-section that includes hooked outer sections.

18. The sliding support assembly of claim 17 wherein the hooked outer sections are downwardly facing and the lipped portions are upwardly facing such that the hooked outer sections extend over the upwardly facing lipped portions.

19. The sliding support assembly of claim 16, wherein a widened upper portion of the body member and second portions of the end pieces extend over the lipped portion.

20. The sliding support assembly of claim 19 wherein the widened upper portion of the body member and the second portions of the end pieces have cross-sections that include hooked outer sections.

21. The sliding support assembly of claim 12 wherein the slide cassette includes first linear guide grooves formed in inner surfaces of each of the first and second flanges.

22. The sliding support assembly of claim 21, wherein second linear guide grooves are formed in external surfaces of each of the third and fourth flanges.

23. The sliding support assembly of claim 22 wherein each of the pair of endless tracks is in the shape of a rounded rectangle with semi-circular ends, wherein the portion of each rectangle closest to the adjacent flange of the elongate rail forms an outer linear portion of the track, and the portion of the rectangle furthest from the adjacent flange of the elongate rail forms an inner linear portion of the track.

24. The sliding support assembly of claim 12, wherein the body member comprises a lower body member and an upper body member.

25. The sliding support assembly of claim 24 wherein the lower body member defines a lower half of each of the pair of endless tracks and the upper body member defines an upper half of each of the pair of endless tracks.

26. The sliding support assembly of claim 24, wherein the widened upper portion is part of the upper body member.

27. The sliding support assembly of claim 24 wherein the upper and lower body members are connected to one another by means of one or more snap-fit joints.

28. The sliding support assembly of claim 23 wherein the first and second guide grooves and the slide cassette form the outer linear portions of the endless tracks, and the slide cassette forms the inner linear portions and the semi-circular end portions of the endless tracks.

29. The sliding support assembly of claim 6, wherein each end piece is formed as a unitary piece.

30. The sliding support assembly of claim 6 wherein each end piece is moulded from a polymer.

31. The sliding support assembly of claim 1 wherein the elongate rail has first linear guide grooves formed in inner surfaces of each of the first and second flanges.

32. The sliding support assembly of claim 1 wherein the first and second flanges are substantially C shaped.

33. The sliding support assembly of claim 1 wherein the slide cassette has a fixing means mounted thereto for connecting the slide cassette to an object.

* * * * *